(12) United States Patent
Thebault

(10) Patent No.: US 7,580,477 B2
(45) Date of Patent: Aug. 25, 2009

(54) TRANSMISSION SYSTEM ENABLING RELIABLE RECEPTION BY A SINGLE DEVICE OF INFORMATION IN CHANNELS CONCURRENTLY TRANSMITTED ON DIFFERENT FREQUENCIES

(75) Inventor: Franck Thebault, Le Mans (FR)

(73) Assignee: ST Wireless SA, Geneva (CH)

( * ) Notice: Subject to any disclaimer, the term of this patent is extended or adjusted under 35 U.S.C. 154(b) by 1059 days.

(21) Appl. No.: 10/354,675

(22) Filed: Jan. 30, 2003

(65) Prior Publication Data

US 2003/0176175 A1 Sep. 18, 2003

(30) Foreign Application Priority Data

Feb. 4, 2002 (FR) .................... 02 01296

(51) Int. Cl.
*H04L 27/00* (2006.01)
(52) U.S. Cl. ...................... 375/299; 375/371
(58) Field of Classification Search ................. 375/299, 375/267, 260, 354, 371, 373
See application file for complete search history.

(56) References Cited

U.S. PATENT DOCUMENTS 5,204,978 A * 4/1993 Shimizu ................. 455/76

OTHER PUBLICATIONS

3GPP TS 05.02 v8.10.0, $3^{rd}$ Generation Partnership Project; Technical Specification Group GSM/EDGE Radio Access Network; Multiplexing and multiple access on the radio path (Release 1999), Aug. 2001, pp. 1-77.

* cited by examiner

*Primary Examiner*—Kevin Y Kim
(74) *Attorney, Agent, or Firm*—Lisa Jorgenson; William J. Kubida; Hogan & Hartson LLP

(57) ABSTRACT

This device utilizes frames transported on carriers of different frequencies (BCCH ext CBCH(SD/8)). For processing the information coming from these frames, the device comprises a transceiver circuit (10) including a phase-locked loop for a local oscillator (12). The information is distributed over these frames in locations so that the loop has time to phase lock the local oscillator (12) for receiving information contained in another frame of a different carrier.

5 Claims, 2 Drawing Sheets

TRANSMISSION SYSTEM ENABLING RELIABLE RECEPTION BY A SINGLE DEVICE OF INFORMATION IN CHANNELS CONCURRENTLY TRANSMITTED ON DIFFERENT FREQUENCIES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a transmission device utilizing a plurality of frequency frames transmitted on different frequency carriers, the device comprising means for removing information from at least two frames.

2. Description of Related Art

The invention finds important applications notably in cellular mobile radio systems satisfying the standards defining the GPRS system which is derived from the well-known GSM system. Because of the fact that information is transmitted in frames having different frequencies, it happens that the transmission devices lose information. This is the case where information is transmitted in frequency frames BCCH and SMSCB. In time, information is so close together that the local oscillator of the phase-locked type does not have time for a phase alignment from one time space of one frame to another time space of the other frame. Information is then lost.

BRIEF SUMMARY OF THE INVENTION

The present invention proposes a device of the type mentioned in the opening paragraph which permits to avoid this loss of information when this information is important for the user.

For this purpose, such a device is characterized in that said tapping means are synchronized for receiving useful information in at least two channels belonging to at least two frames of different carriers.

The idea of the invention comprises shifting in time the information which is important for the user.

The invention also relates to a frame corresponding to the measures according to the invention so that said important information is sufficiently separated in time for the local oscillator to be phase-locked and thus to ensure the reception of useful information. The invention relates to a system in which this frame is made use of, and also a transmission method according to which the important information which forms part of the carrier frame of different frequencies is separated sufficiently long so that a phase-locked loop for a local receiving oscillator has the time to be locked.

These and other aspects of the invention are apparent from and will be elucidated, by way of non-limiting example, with reference to the embodiments described hereinafter.

BRIEF DESCRIPTION OF THE SEVERAL VIEWS OF THE DRAWING(S)

DETAILED DESCRIPTION OF THE INVENTION

Figure 1:
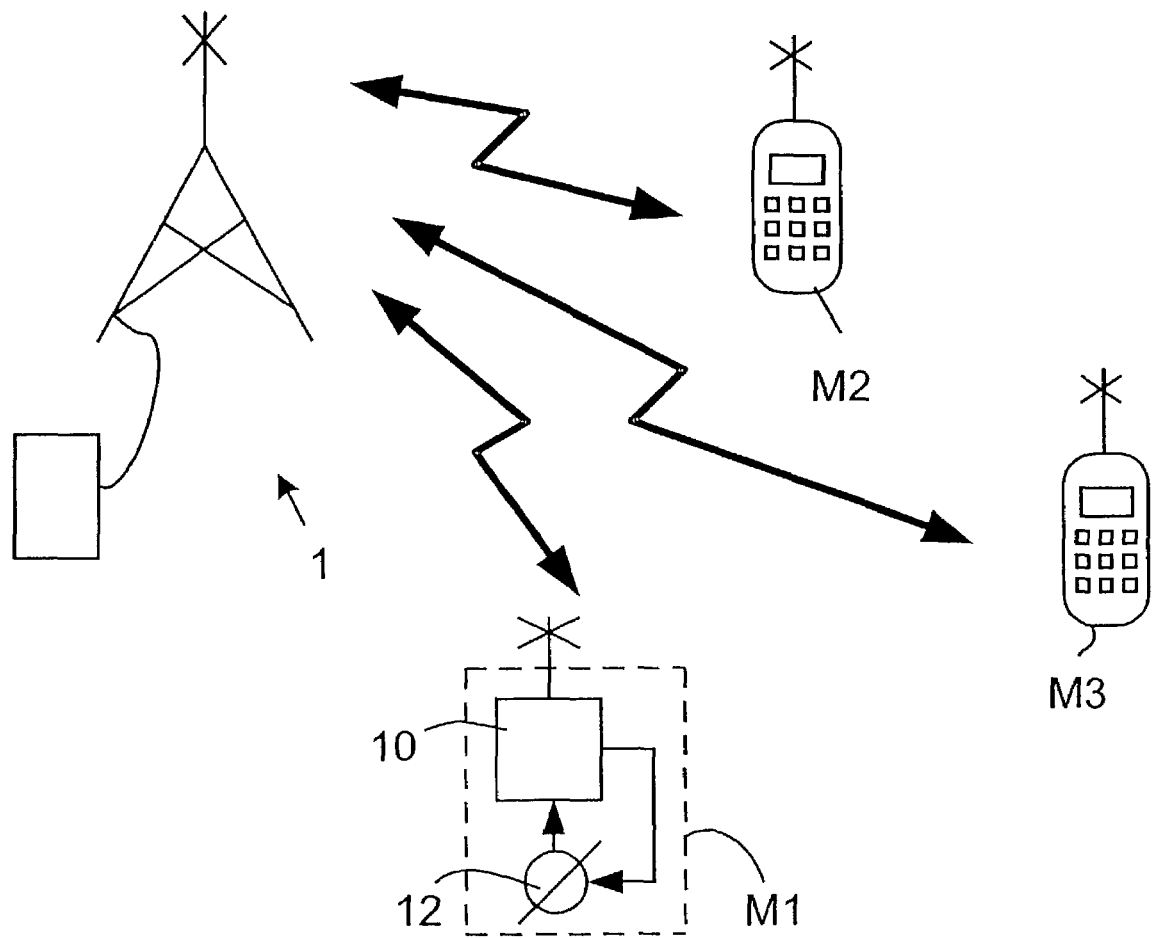
FIG. 1 shows a system in accordance with the invention.
Figure 2:
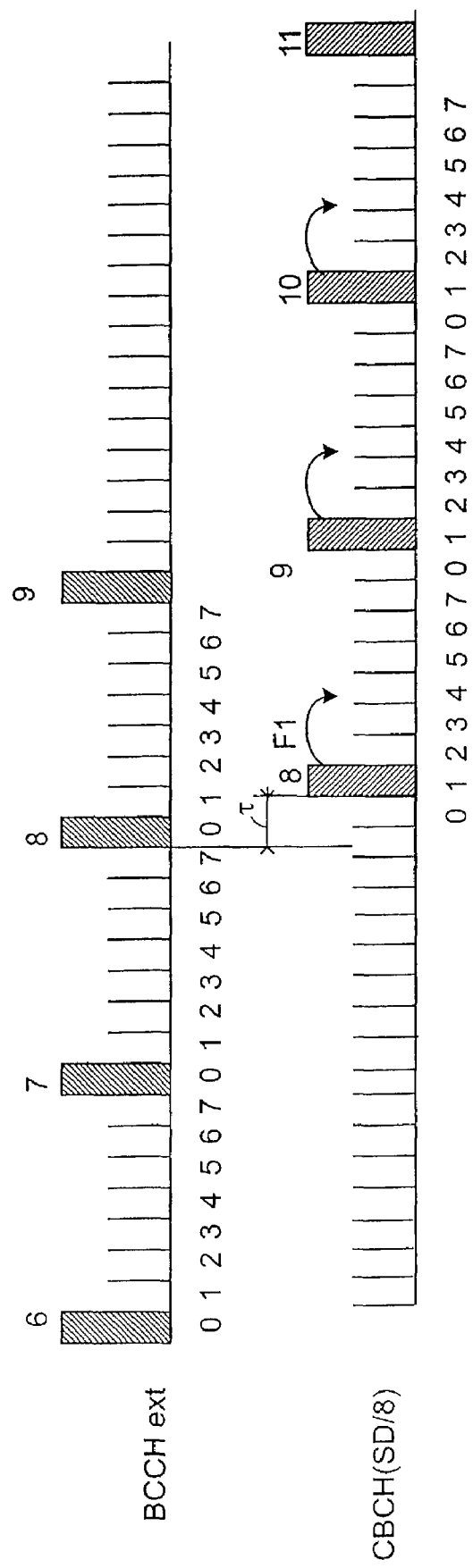
FIG. 2 shows how frames are established in accordance with the invention.

FIG. 1 shows a system in accordance with the invention represented in a diagrammatic way. This system satisfies the GSM standards which imply a multitude of cells which are made dependent on one base station 1. A plurality of transmission devices (mobile stations) M1, M2, M3 . . . may be located in this cell. In FIG. 1 only the station M1 is shown a little more in detail. The exchange of information between the mobile stations takes place by radio channel by means of time-multiplexed signal frames. Two of these frames BCCH ext and CBCH(SD/8) are shown in FIG. 2. These frames are conveyed by a carrier of a certain frequency. For receiving and transmitting these signals the mobile stations have a transceiver circuit referred to as 10 in FIG. 1 with respect to the mobile station M1. These circuits 10 comprise a local oscillator 12 which forms part of a phase-locked loop. When a frequency change is imposed, the locking of this loop requires a certain time of which the duration is longer than the time slots used by the time multiplex constituting said frames. Thus certain information runs the risk of being lost during a change of frames. The invention proposes measures for avoiding this sort of inconvenience. The invention specially fits in the framework of GSM-GPRS standards. On this subject could be consulted the description of the standard more specifically:

3GPP TS 05.02-v8.10.0 (20001).

When the mobile station is in the 51 mode (packet idle 51 mode) it is to read the time slot Si13 every 30 s. This time slot is transported on the frame BCCH or its extended variant BCCH ext (see 6.3.1.3 of the standard mentioned earlier). The term "packet idle 51" relates to the GPRS idle mode in the configuration 51. If, thus, this time slot is situated in this frame BCCH, there will be a conflict with the time slots that relate to the data blocks SMSCB (case where SMSCB is situated on the sub-channel 2 of SD/8).

It will be recalled that:

BCCH (Broadcast Control Channel) is a channel utilized for broadcasting information relating to the cell in which the mobile is located. In FIG. 2 the transmitted blocks of importance to the mobile station are shown by Figures 6, 7, 8 and 9.

SMSCB is used for broadcasting short messages, for example, relating to the Met office, road traffic etc. These blocks are located in frames 8 to 11 (modulo 51) in the configuration SD/8 of CBCH.

While reference is made to FIG. 2, it is supposed by way of example that to the mobile station is assigned the time slot 0 in the idle mode mentioned above. If messages are transmitted while the time slot 1 is utilized in another, different carrier frame, it is taken into consideration that the elapse of time τ that exists between the time slots that transport important information is too short for the mobile station to be able to process it. There is not enough time for the phase locking. To avoid this conflict there is proposed to modify the location of the time slots as the arrows in FIG. 1 show.

Within the framework of the standards mentioned above, it is possible by way of example to change the arrangement in the following manner:

If Si13 is placed on BCCH ext, the messages SMSCB will be broadcast in accordance with the configuration SD/4.

If SI13 is placed on BCC the messages will be broadcast according to the configuration SD/4 or SD/8.

The invention claimed is:

1. A transmission system comprising:
    at least one base station that transmits a plurality of frames in channels transmitted on different frequency carriers, and
    at least a device synchronized for receiving useful information in at least two channels belonging to at least two frames of said different frequency carriers, comprising a local oscillator included in a phase-locked loop, the phase-locked loop exhibiting a characteristic locking time,
    wherein the base station concurrently transmits information on said different frequency carriers including first information to be received by the device and second information to be received by the device, the first information and the second information being transmitted in frames on different ones of said different frequency carriers, at times separated by at least said characteristic locking time.

2. The system of claim 1, wherein the first information and the second information are transmitted in different time periods.

3. A system as claimed in claim 2, wherein the system complies with the GSM standards, the first item of information being transmitted on BCCH extended frames and the second item of information being transmitted on CBCH(SD/8), wherein the first information and the second information are shifted with respect to time.

4. A method of transmitting first information and second information from a base station to a device comprising a local oscillator included in a phase-locked loop, the phase-locked loop exhibiting a characteristic locking time, the method comprising:
    the base station concurrently transmitting information on different frequency carriers including a frequency carrier of a first frequency and a frequency carrier of a second different frequency;
    the base station transmitting first information within a frame using said first frequency;
    the base station transmitting second information within a frame using said second frequency wherein the first information and the second information are transmitted at times separated by at least said characteristic locking time; and
    synchronizing the device to receive the first information and the second information.

5. The method of claim 4, wherein the system complies with the GSM standards, the first item of information being transmitted on BCCH extended frames and the second item of information being transmitted on CBCH(SD/8), wherein the first information and the second information are shifted with respect to time.

* * * * *

UNITED STATES PATENT AND TRADEMARK OFFICE
CERTIFICATE OF CORRECTION

PATENT NO.        : 7,580,477 B2                                    Page 1 of 1
APPLICATION NO.   : 10/354675
DATED             : August 25, 2009
INVENTOR(S)       : Franck Thebault It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1730 days.

Signed and Sealed this

Fourteenth Day of September, 2010

David J. Kappos
*Director of the United States Patent and Trademark Office*